United States Patent
Hu et al.

(10) Patent No.: US 11,571,767 B2
(45) Date of Patent: Feb. 7, 2023

(54) LASER PROCESSING DEVICE AND LASER PROCESSING METHOD

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Hongwei Hu, Beijing (CN); Wanmei Qing, Beijing (CN); Yanxia Xin, Beijing (CN); Mingyin Yu, Beijing (CN); Jianmin She, Beijing (CN); Xueping Li, Beijing (CN); Ying Cao, Beijing (CN); Qiao Feng, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 486 days.

(21) Appl. No.: 16/345,835

(22) PCT Filed: Nov. 7, 2018

(86) PCT No.: PCT/CN2018/114320
§ 371 (c)(1),
(2) Date: Apr. 29, 2019

(87) PCT Pub. No.: WO2019/114466
PCT Pub. Date: Jun. 20, 2019

(65) Prior Publication Data
US 2021/0323095 A1    Oct. 21, 2021

(30) Foreign Application Priority Data
Dec. 13, 2017  (CN) .......................... 201711327699.2

(51) Int. Cl.
*B23K 26/38*   (2014.01)
*B23K 26/0622*  (2014.01)
(Continued)

(52) U.S. Cl.
CPC ............ *B23K 26/38* (2013.01); *B23K 26/064* (2015.10); *B23K 26/0604* (2013.01);
(Continued)

(58) Field of Classification Search
CPC .... B23K 26/50; B23K 26/38; B23K 26/0624; B23K 26/082; B23K 26/0604;
(Continued)

(56) References Cited

U.S. PATENT DOCUMENTS 6,809,291 B1 * 10/2004 Neil .................... B23K 26/0613
219/121.68
7,638,729 B2 * 12/2009 Park .................... B23K 26/0676
219/121.67
(Continued)

FOREIGN PATENT DOCUMENTS

CN   101811227 A   8/2010
CN   204116671 U   1/2015
(Continued)

OTHER PUBLICATIONS

Third Office Action for Chinese Application No. 201711327699.2, dated Dec. 9, 2020, 10 Pages.
(Continued)

*Primary Examiner* — Sang Y Paik
*Assistant Examiner* — Erwin J Wunderlich
(74) *Attorney, Agent, or Firm* — Brooks Kushman P.C.

(57) ABSTRACT

A laser processing device and a laser processing method are provided. The laser processing device includes: at least two lasers each configured to generate a laser beam; focusing members corresponding to the at least two lasers respec-
(Continued)

tively and configured to adjust focus positions of at least two laser beams generated by the at least two lasers; and a beam combination member configured to receive the at least two laser beams whose focus positions have been adjusted, and output the at least two laser beams coaxially.

9 Claims, 6 Drawing Sheets (51) Int. Cl.
  B23K 26/06 (2014.01)
  B23K 26/064 (2014.01)
  B23K 101/36 (2006.01)
  B23K 103/00 (2006.01)
  B23K 26/082 (2014.01)

(52) U.S. Cl.
  CPC ...... *B23K 26/0617* (2013.01); *B23K 26/0624* (2015.10); *B23K 26/0648* (2013.01); *B23K 26/082* (2015.10); *B23K 2101/36* (2018.08); *B23K 2103/54* (2018.08)

(58) Field of Classification Search
  CPC ............ B23K 26/0648; B23K 2101/36; B23K 2103/54; B23K 26/0617; B32K 26/53; B32K 26/55
  USPC .................................................. 219/121.67
  See application file for complete search history.

(56) References Cited

U.S. PATENT DOCUMENTS

| | | |
|---|---|---|
| 8,173,930 B2 | 5/2012 | Park |
| 2006/0261051 A1 | 11/2006 | Unrath et al. |
| 2007/0228616 A1* | 10/2007 | Bang .................. B23K 26/0624 264/405 |
| 2008/0264910 A1 | 10/2008 | Kashyap et al. |
| 2011/0239421 A1* | 10/2011 | Tertitski ............. B23K 26/0876 29/25.01 |
| 2013/0221053 A1* | 8/2013 | Zhang .................. C03B 33/102 225/2 |
| 2015/0165548 A1* | 6/2015 | Marjanovic .......... B23K 26/361 428/43 |
| 2015/0246412 A1 | 9/2015 | Mendes et al. |
| 2017/0189991 A1* | 7/2017 | Gollier ............... B23K 26/0613 |
| 2018/0186678 A1 | 7/2018 | Boeker et al. |

FOREIGN PATENT DOCUMENTS

| | | |
|---|---|---|
| CN | 104741798 A | 7/2015 |
| CN | 104972221 A | 10/2015 |
| CN | 205129179 U | 4/2016 |
| CN | 105772947 A | 7/2016 |
| CN | 106232283 A | 12/2016 |
| CN | 106604898 A | 4/2017 |
| CN | 106964894 A | 7/2017 |
| CN | 107234347 A | 10/2017 |
| GB | 2175737 A | 12/1986 |
| JP | 2003154478 A | 5/2003 |
| JP | 2004154813 A | 6/2004 |

OTHER PUBLICATIONS

First Office Action for Chinese Application No. 201711327699.2, dated Nov. 1, 2019, 10 Pages.

Written Opinion of the International Searching Authority for International Application No. PCT/CN2018/114320, dated Dec. 13, 2017.

Extended European Search Report Application No. 18867313.1 dated Sep. 10, 2021, 7 Pages.

* cited by examiner

LASER PROCESSING DEVICE AND LASER PROCESSING METHOD

CROSS-REFERENCE TO RELATED APPLICATION APPLICATIONS

This application is the U.S. national phase of PCT Application No. PCT/CN2018/114320 filed on Nov. 7, 2018, which claims priority to Chinese Patent Application No. 201711327699.2 filed on Dec. 13, 2017, which are incorporated herein by reference in their entireties.

TECHNICAL FIELD

The present disclosure relates to the field of machine processing technology, in particular to a laser processing device and a laser processing method.

BACKGROUND

Laser cutting technology has been increasingly and widely applied in the industry due to such advantages as high precision, flexible and non-contact machining process, and less thermal effect on a material. An energy density of a laser beam gradually decreases from a midpoint of a focus area (where the laser beam has a maximum energy density) to the outside.

Hence, when a to-be-processed workpiece has a thickness greater than a thickness of the energy focus area of the laser beam, it is necessary to cut the to-be-processed workpiece through the laser beam multiple times. During this period, a laser cutting line may be offset greatly, and thereby the yield may be adversely affected.

SUMMARY

An object of the present disclosure is to provide a laser processing device and a laser processing method.

In one aspect, the present disclosure provides in some embodiments a laser processing device, including: at least two lasers, wherein each of the at least two lasers is configured to generate a laser beam; focusing members, wherein the focusing members are arranged corresponding to the at least two lasers respectively in a one-to-one manner, and configured to adjust focusing positions of at least two laser beams generated by the at least two lasers; and a beam combination member configured to receive the at least two laser beams whose focusing positions have been adjusted, and coaxially output the at least two laser beams.

In some embodiments of the present disclosure, the laser processing device further includes: a galvanometer scanner configured to receive the at least two laser beams outputted coaxially by the beam combination member, and coaxially output the at least two laser beams to a to-be-processed workpiece.

In some embodiments of the present disclosure, the focusing member is a dynamic focusing lens having a variable focal length, or a focusing lens having a fixed focal length and located at a variable position relative to the beam combination member.

In some embodiments of the present disclosure, the to-be-processed workpiece is an organic light-emitting diode (OLED) display panel.

In some embodiments of the present disclosure, the at least two lasers include a carbon dioxide laser and a femtosecond laser.

In some embodiments of the present disclosure, the laser processing device further includes: a first controller configured to control an operating state of each of the at least two lasers in accordance with a current operating mode; and/or a second controller configured to control the focusing member in accordance with a target focusing position.

In some embodiments of the present disclosure, when the focusing member is a dynamic focusing lens having a variable focal length, the second controller is further configured to control a focal length and/or a position of the dynamic focusing lens in accordance with the target focusing position; when the focusing member is a focusing lens having a fixed focal length and located at a variable position relative to the beam combination member, the second controller is further configured to control a position of the focusing lens in accordance with the target focusing position.

In some embodiments of the present disclosure, the at least two lasers include a first laser and a second laser, and an optical axis of a first laser beam perpendicularly intersects an optical axis of a second laser beam at the beam combination member. The first laser beam is generated by the first laser and adjusted by one of the focusing members corresponding to the first laser, and the second laser beam is generated by the second laser and adjusted by another one of the focusing members corresponding to the second laser.

In another aspect, the present disclosure provides in some embodiments a method for manufacturing a display product through the above-mentioned laser processing device, including: controlling at least one laser of at least two lasers of the laser processing device to generate a respective laser beam in accordance with a current operating mode of the laser processing device; adjusting a focusing position of the respective laser beam generated by the at least one laser; and coaxially outputting the respective laser beam whose focusing position has been adjusted.

In some embodiments of the present disclosure, the controlling the at least one laser of the at least two lasers of the laser processing device to generate the laser beam in accordance with the current operating mode of the laser processing device includes, when the current operating mode of the laser processing device is a full-cutting mode or a chamfer cutting mode, controlling the at least two lasers of the laser processing device to generate the laser beams respectively.

In some embodiments of the present disclosure, the controlling the at least two lasers of the laser processing device to generate the laser beams respectively includes: controlling at least one carbon dioxide laser and at least one femtosecond laser of the laser processing device to generate the laser beams respectively.

In some embodiments of the present disclosure, the controlling the at least one laser of the at least two lasers of the laser processing device to generate the laser beam in accordance with the current operating mode of the laser processing device includes, when the current operating mode of the laser processing device is a pad open cutting mode, controlling one of the at least two lasers of the laser processing device to generate the laser beam, and controlling the remaining lasers of the at least two lasers of the laser processing device not to generate any laser beam.

In some embodiments of the present disclosure, the controlling one of the at least two lasers of the laser processing device to generate the laser beam and controlling the remaining lasers of the at least two lasers of the laser processing device not to generate any laser beam includes: controlling at least one carbon dioxide laser of the laser processing device to generate the laser beam, and controlling at least one femtosecond laser of the laser processing device not to generate any laser beam.

Figure 9:
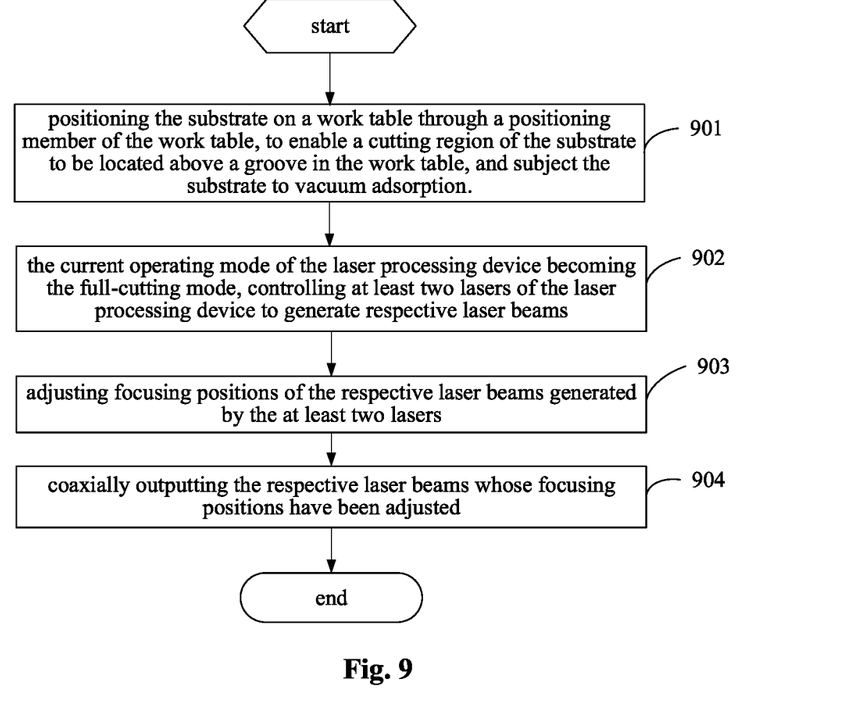
FIG. 9 is a flow chart of another method for manufacturing a display product according to one embodiment of the present disclosure.

In some embodiments of the present disclosure, in the full-cutting mode, a substrate is cut into a plurality of substrate units through the laser beam. As illustrated in FIG. 9, before the laser processing device is switched from the current operating mode to the full-cutting mode, the method further includes: positioning the substrate on a work table through a positioning member of the work table, to enable a cutting region of the substrate to be located above a groove in the work table, and subject the substrate to vacuum adsorption.

In some embodiments of the present disclosure, in the pad open cutting mode, the substrate is cut into a plurality of substrate units, and a pad open cutting operation is performed on each substrate unit through the laser beam.

In some embodiments of the present disclosure, in the chamfer cutting mode, a pad open cutting operation is performed on each substrate unit, and then a chamfer cutting operation is performed on the substrate unit through the laser beam. When the current operating mode of the laser processing device is the chamfer cutting mode, subsequent to controlling the at least two lasers of the laser processing device to generate the laser beams respectively, the method further includes: controlling an incident angle of each laser beam relative to a surface of each substrate unit through a galvanometer scanner, to perform the chamfer cutting operation on the substrate unit.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a laser processing device which includes at least two lasers, focusing members corresponding to the at least two lasers respectively, and a beam combination member. Each laser is configured to generate a laser beam, each focusing member is configured to adjust a focusing position of the laser beam generated by the corresponding laser, and the beam combination member is configured to receive the at least two laser beams whose focusing positions have been adjusted, and output the at least two laser beams coaxially.

Figure 1:
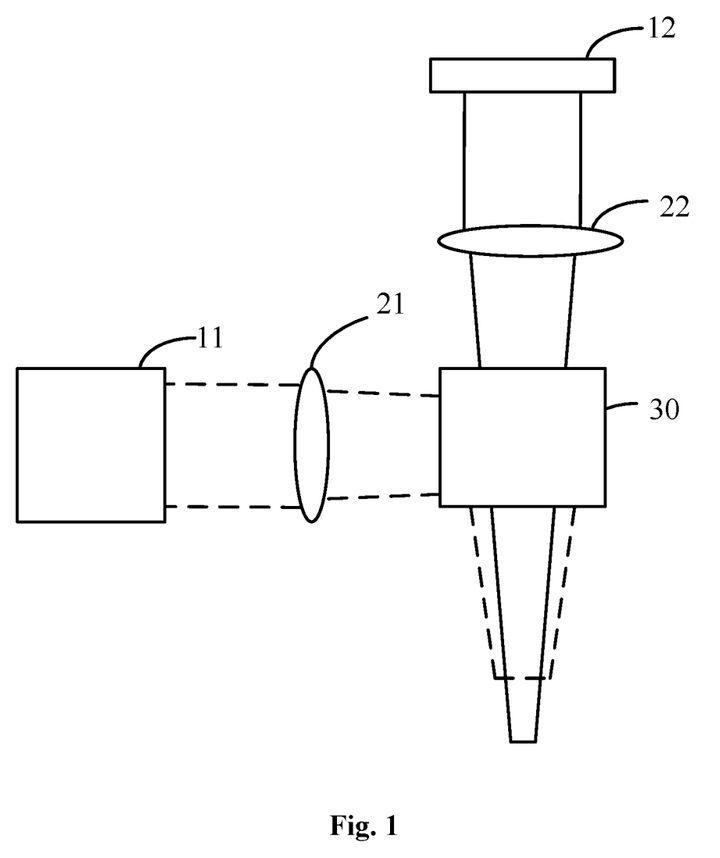
FIG. 1 is a schematic view showing a laser processing device according to one embodiment of the present disclosure.

In the embodiments of the present disclosure, as shown in FIG. 1, the laser processing device includes a first laser 11, a second laser 12, a first focusing member 21 corresponding to the first laser 11, a second focusing member 22 corresponding to the second laser 12, and a beam combination member 30. It should be appreciated that, the number of the lasers of the laser processing device is for illustration purpose only and not limited to two, and in some other embodiments of the present disclosure, the laser processing device may include three or more lasers, i.e., the number of the lasers may be determined in accordance with the practical need.

An optical path in the laser processing device will be described as follows. The laser beams may be generated by the first laser 11 and the second laser 12 respectively. The laser beam generated by the first laser 11 (indicated by dotted lines in FIG. 1) may be adjusted by the first focusing member 21, so as to acquire a first laser beam whose focusing position has been adjusted. The laser beam generated by the second laser 12 (indicated by solid lines in FIG. 1) may be adjusted by the second focusing member 22, so as to acquire a second laser beam whose focusing position has been adjusted. And then, the first laser beam and the second laser beam may be both directed toward the beam combination member 30 (in some embodiments of the present disclosure, an optical axis of the first laser beam may perpendicularly intersect an optical axis of the second laser beam at the beam combination member 30), and then the beam combination member 30 may adjust a transmission path of each of the first laser beam and the second laser beam in such a manner as to coaxially output the first laser beam and the second laser beam.

As shown in FIG. 1, when the first laser beam and the second laser are outputted coaxially by the beam combination member 30, because the first laser beam has a focusing position and a focusing depth different from the second laser beam, it is able to cut a to-be-processed workpiece at different depths through the first laser beam and the second laser beam.

There exists at least one of the following beneficial effects for the laser processing device in the embodiments of the present disclosure.

1. As compared with the related art where the first laser beam and the second laser beam are applied to the to-be-processed workpiece successively, in the embodiments of the present disclosure, the first laser beam and the second laser beam are applied to the to-be-processed workpiece simultaneously, so it is able to improve the tact time.

2. In the related art, when the first laser beam and the second laser beam are successively applied to two adjacent film layers of the to-be-processed workpiece respectively, a cutting path formed by the first laser beam may probably be offset from a cutting path formed by the second laser beam. In contrast, in the embodiments of the present disclosure, the first laser beam and the second laser beam are outputted coaxially and applied to the to-be-processed workpiece simultaneously, so it is able to perform a cutting operation through the first laser beam and the second laser beam at a same offset amount, thereby to improve the processing precision.

3. As compared with the related art where the first laser beam and the second laser beam are applied to the to-be-processed workpiece successively, in the embodiments of the present disclosure, the first laser beam and the second laser beam are outputted coaxially and applied to the to-be-processed workpiece simultaneously, so it is able to improve the energy utilization through the accumulation of the energy of the first laser beam and the second laser beam, reduce the energy consumption of the lasers, reduce the occurrence of smoke, dust and particles during the cutting, and reduce a size of a thermally-affected area.

Further, as shown in FIG. 1, the at least two laser beams coaxially outputted by the beam combination member 30 may be directly applied to the to-be-processed workpiece, so as to cut the to-be-processed workpiece. In this regard, the laser processing device may move as a whole along with a work table, so as to perform the cutting operation on different portions of the to-be-processed workpiece.

Figure 2:
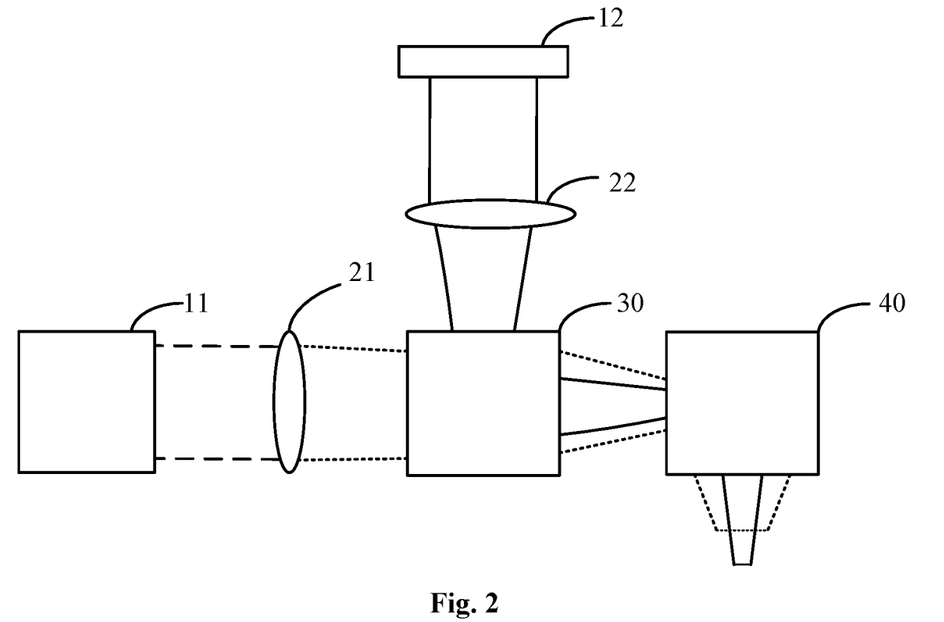
FIG. 2 is a schematic view showing a laser processing device according to another one embodiment of the present disclosure.

As shown in FIG. 2, the laser processing device may further include a galvanometer scanner 40 configured to receive the at least two laser beams coaxially outputted by the beam combination member 30, and coaxially output the at least two laser beams to the to-be-processed workpiece, so as to cut the to-be-processed workpiece.

Based on the above description, when at least two lasers operate simultaneously, it is necessary for the galvanometer scanner 40 to ensure the optical axes of the at least two laser beams to be identical to each other while adjusting an output angle and an output position of each of the at least two laser beams coaxially outputted by the beam combination member 30. In this case, as shown in FIG. 2, the galvanometer scanner 40 may be located at a fixed position relative to the beam combination member 30, and the laser processing device may move along with the work table so as to control a processing position.

However, it should be appreciated that, in some scenarios merely one laser needs to operate, and at this time, the galvanometer scanner may adjust the output angle and the output position of the one laser beam from the laser, so as to perform the cutting operation on different portions of the to-be-processed workpiece.

As compared with a mode where the laser processing device moves along with the work table, through the adjustment of a position of the galvanometer scanner 40 relative to the beam combination member 30, it is able to control the output angle of the laser beam, thereby to control a cutting position in a more convenient and accurate manner.

In FIG. 2, the transmission path of the first laser beam is perpendicular to the transmission path of the second laser beam, and the transmission path of the laser beam outputted by the beam combination member 30 is parallel to the transmission path of the first laser beam and perpendicular to the transmission path of the second laser beam. The laser beam outputted by the galvanometer scanner is perpendicular to the laser beam outputted by the beam combination member 30. It should be appreciated that, in some other embodiments of the present disclosure, an angle between the transmission paths of the first laser beam and the second laser beam may be of any other value, which will not be particularly defined herein.

The beam combination member 30 is mainly configured to combine, and then coaxially output, the first laser beam and the second laser beam.

To be specific, the beam combination member 30 may be a beam combiner, a polarization beam splitter (PBS) film or a birefringent crystal configured to combine the beams in accordance with a polarization difference between the first laser beam and the second laser beam, or a device such as an evanescent wave coupler, an Fabry-Perot (F-P) interferometric cavity or a crystal interferometer configured to combine the beams in accordance with a wavelength difference between the first laser beam and the second laser beam.

In addition, the beam combination member 30 may also be a beam combination prism. A working principle of the beam combination prism will be described hereinafter with reference to FIG. 3.

Figure 3:
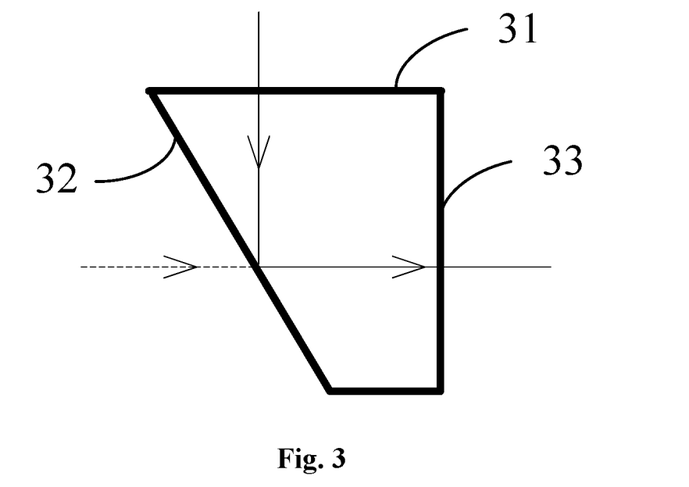
FIG. 3 is a schematic view showing a working principle of a beam combination member according to one embodiment of the present disclosure.

As shown in FIG. 3, the beam combination prism may at least include a first surface 31, a second surface 32 and a third surface 33. The first surface 31 is configured to receive the second laser beam (indicated by a solid line with an arrow) and arranged perpendicular to the transmission path of the second laser beam. The second surface 32 is configured to receive the first laser beam (indicated by a dotted line with an arrow). In addition, the second surface 32 is further configured to totally reflect the second laser beam, so as to enable the totally reflected second laser beam as well as the first laser beam to coaxially exit from the third surface 33 of the beam combination prism.

The galvanometer scanner 40 is configured to change emergent directions of the coaxial laser beams and control offset angles of the coaxial laser beams, so as to control a scanning operation of the coaxial laser beams. To be specific, the laser processing device may control, through the galvanometer scanner 40, the coaxial laser beams to scan a surface of the to-be-processed workpiece along a specific movement trajectory and a specific scanning speed, so as to enable the coaxial layer beams to cut the to-be-processed workpiece.

In the embodiments of the present disclosure, it is necessary to adjust through each focusing member the focusing position of the laser beam generated by the corresponding laser. The focusing position of the laser beam generated by the corresponding laser may be adjusted through the focusing member in various ways, which will be described hereinafter.

In some embodiments of the present disclosure, each focusing member may be a dynamic focusing lens having a variable focal length.

Figure 4A:
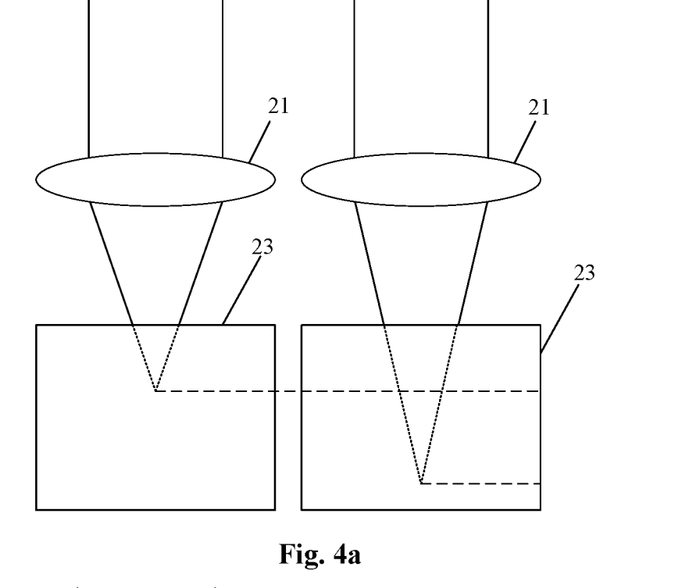
FIG. 4*a* is a schematic view showing one mode of controlling a focusing position of a laser beam through a focusing member according to one embodiment of the present disclosure.

When the focusing member is the dynamic focusing lens having a variable focal length, the focusing depth of each of the first laser beam and the second laser beam in the to-be-processed workpiece 23 may be associated with a the focal length of the corresponding focusing member through which each of the first laser beam and the second laser beam passes. To be specific, taking the first focusing member 21 as an example, as shown in FIG. 4a, when the first focusing member 21 is located at a fixed position, the focal length of the first focusing member may be adjusted. When the focal length of the first focusing member 21 increases, it is able for the corresponding laser beam passing through the first focusing member 21 to cut a portion of the to-be-processed workpiece 23 at a deeper position. In contrast, when the focal length of the first focusing member 21 decreases, it is able for the corresponding laser beam to cut a portion of the to-be-processed workpiece 23 at a shallower position.

Hence, in the embodiments of the present disclosure, it is able to control the focal length of each focusing member in accordance with the target focusing position, thereby to enable the corresponding laser beam to cut a portion of the to-be-processed workpiece at a target depth.

In some other embodiments of the present disclosure, the focusing member may also be a focusing lens having a fixed focal length and located at a variable position relative to the beam combination member.

Figure 4B:
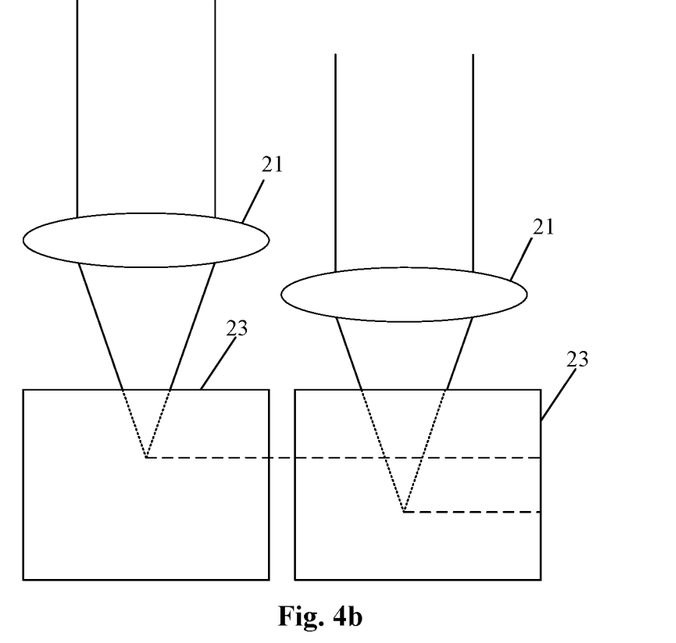
FIG. 4*b* is a schematic view showing another mode of controlling the focusing position of the laser beam through the focusing member according to one embodiment of the present disclosure.

In this case, the focusing depth of each of the first laser beam and the second laser beam in the to-be-processed workpiece 23 may be associated with a position of the corresponding focusing member. To be specific, taking the first focusing member 21 as an example, as shown in FIG. 4b, when the first focusing member 21 is located at a position closer to the to-be-processed workpiece, it is able for the laser beam passing through the first focusing member 21 to cut a portion of the to-be-processed workpiece 23 at a deeper position. In contrast, when the first focusing member 21 is located at a position further away from the to-be-processed workpiece, it is able for the corresponding laser beam to cut a portion of the to-be-processed workpiece 23 at a shallower position.

Hence, in the embodiments of the present disclosure, it is able to control the position of each focusing member in accordance with the target focusing position, thereby to enable the corresponding laser beam to cut a portion of the to-be-processed workpiece at the target depth.

It should be appreciated that, when the focusing member is the dynamic focusing lens having a variable focal length, the focusing position of the laser beam may also be adjusted through the adjustment of the position of the focusing member simultaneously.

It should be appreciated that, in order to ensure that a cutting region for the laser beam whose focusing position is further away from the surface of the to-be-processed workpiece is not greater than a cutting region for the laser beam whose focusing position is closer to the surface of the to-be-processed workpiece, a cutting path of the laser beam whose focusing position is closer to the surface of the to-be-processed workpiece may have a width greater than a cutting path of the laser beam whose focusing position is further away from the surface of the to-be-processed workpiece, i.e., an amount of a portion of the to-be-processed workpiece to be cut through the laser beam whose focusing position is closer to the surface of the to-be-processed workpiece may be greater than an amount of a portion of the to-be-processed workpiece to be cut through the laser beam whose focusing position is further away from the surface of the to-be-processed workpiece. The so-called "width" refers to a length of the portion of the to-be-processed workpiece to be cut through the laser beam in a direction perpendicular to an extension direction of the cutting path of the laser beam.

For example, the laser beam whose focusing position is closer to the surface of the to-be-processed workpiece may be the first laser beam, and the laser beam whose focusing position is further away from the surface of the to-be-processed workpiece may be the second laser beam. At this time, the first focusing member 21 may have a focal length smaller than the second focusing member 22, and an amount of a portion of the to-be-processed workpiece to be cut through the first laser beam may be greater than an amount of a portion of the to-be-processed workpiece to be cut through the second laser beam. For ease of understanding, in the following, as an example, the laser beam whose focusing position is closer to the surface of the to-be-processed workpiece is just the first laser beam, and the laser beam whose focusing position is further away from the surface of the to-be-processed workpiece is just the second laser beam.

For a gaseous laser, a continuous wave is adopted and more heat is generated, so it is suitable for a processing operation with a relatively large cutting amount. For a solid state laser, an impulse wave having a relatively short pulse time (usually at a $10^{-12}$-second level) is adopted, so it is suitable for a processing operation with a small cutting amount. Hence, the first laser 11 may be a gaseous laser, and the second laser 12 may be a solid state laser. In actual use, the first laser 11 may be a carbon dioxide ($CO_2$) laser, and the second laser 12 may be a femtosecond laser.

At the beginning of the cutting operation, due to a large amount of heat generated by the gaseous laser, it is able to quickly cut the to-be-processed workpiece to a certain depth. Due to a small focal length, it is impossible for the laser beam generated by the gaseous laser to cut a portion of the to-be-processed workpiece at a larger depth. The femtosecond laser has a larger focal length, so it is able to cut a portion of the to-be-processed workpiece at a larger depth. At this time, through the femtosecond laser, the laser beam having a larger focal length may be provided, so as to perform the cutting operation at a larger depth. Through the combination of the two types of lasers, it is able to improve the cutting efficiency while ensuring the cutting precision.

In actual use, the focal length of the focusing member of the laser processing device may be adjusted flexibly in accordance with an actual cutting depth of the to-be-processed workpiece. In a possible embodiment of the present disclosure, the laser processing device may further include a controller 50 configured to control the focal length and/or the position of the dynamic focusing lens when the focusing member is the dynamic focusing lens having a variable focal length, so as to control the focusing position of the laser beam. When the focusing member is the focusing lens having a fixed focal length and arranged at a variable position relative to the beam combination member, the controller 50 may control the position of the focusing lens, so as to control the focusing position of the laser beam. In actual use, the controller 50 for controlling the focal length of the focusing member may be arranged in the focusing member, or arranged separately from the focusing member.

Figure 5:
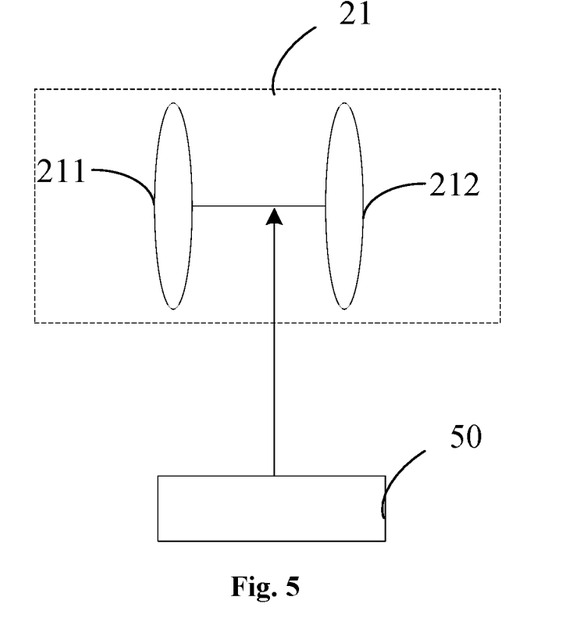
FIG. 5 is a schematic view showing the focusing member according to one embodiment of the present disclosure.
Figure 10:
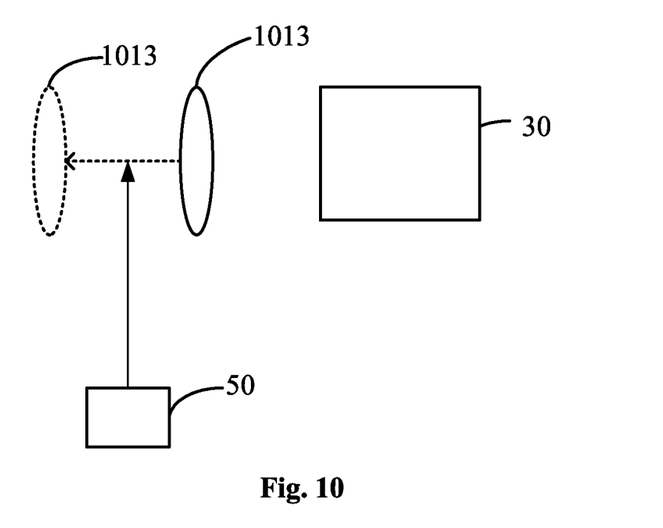
FIG. 10 is a schematic view showing the focusing member according to another one embodiment of the present disclosure.

To be specific, as shown in FIG. 5, for example, when the first focusing member 21 may be the dynamic focusing lens including a first lens 211 and a second lens 212 connected in series to each other. The controller 50 may dynamically adjust a distance between the first lens 211 and the second lens 212, so as to dynamically focus the received laser beam to an appropriate position. It should be appreciated that, the number of the lenses in FIG. 5 is merely for illustrative purpose, i.e., the number of the lenses of the dynamic focusing lens will not be particularly defined herein. Similarly, when the second focusing member 22 is the dynamic focusing lens, a control unit corresponding to the second focusing member 22 may also control the focal length of the dynamic focusing lens in a same way. As shown in FIG. 10, for another example, when the focusing member is the focusing lens 1013 having a fixed focal length and arranged at a variable position relative to the beam combination member 30, the controller 50 may control the position of the focusing lens 1013, so as to control the focusing position of the laser beam.

Figure 8:
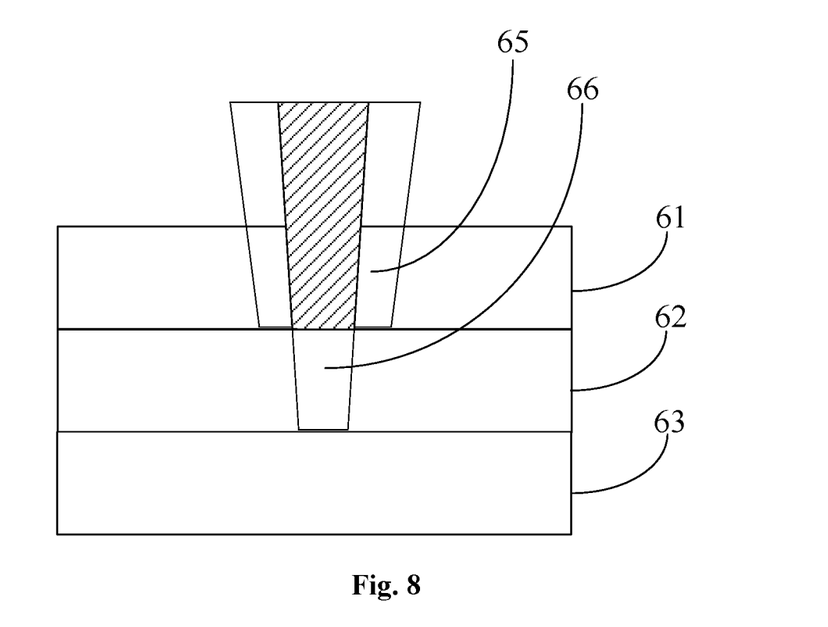
FIG. 8 is a schematic view showing a situation where a first laser beam and a second laser beam are focused on an OLED display panel according to one embodiment of the present disclosure.

In the embodiments of the present disclosure, the to-be-processed workpiece may be an OLED display panel (e.g., a flexible display panel). As shown in FIG. 8, the OLED display panel may include, but not limited to, an upper protection layer 61, a body layer 62 and a lower protection layer 63.

During the manufacture of the OLED display panel, in order to improve the production efficiency, reduce the manufacture cost and achieve the mass production, usually a plurality of OLED display panels is manufactured through a large-size glass substrate. Hence, in order to facilitate the subsequent processes for the OLED display panel, the entire glass substrate may be cut by the laser processing device into the OLED display panels in a full-cutting manner. For example, during the manufacture of the OLED display, prior to the full-cutting step, a to-be-cut flexible substrate may be moved by a mechanical arm onto a load table. Then, a support pin for the load table may move downward, such that the flexible substrate on the load table may be adsorbed by a load picker table and transferred upward to a work table. Next, the flexible substrate may be positioned by an alignment device on the work table, and then subjected to vacuum adsorption (a cutting dummy region of the positioned flexible substrate is arranged above a groove in the work table, and the groove is configured to receive the laser beam for cutting the flexible substrate). At this time, the above-mentioned full-cutting operation may be performed. In a possible embodiment of the present disclosure, during the full-cutting operation, the work table may move, so as to facilitate the full-cutting operation through the at least first laser beam and second laser beam outputted coaxially, thereby to cut the flexible substrate into the plurality of OLED display panels. In another possible embodiment of the present disclosure, a plurality of groups of lasers (e.g., four groups of lasers) may be arranged side by side so as to perform the full-cutting operation simultaneously, and each group of the lasers includes at least the first laser and the second laser, thereby to improve the cutting efficiency.

Subsequent to the above full-cutting step and prior to a chamfer cutting step to be described below, each display panel may be subjected to a pad open cutting operation through the laser processing device, so as to remove the upper protection layer from the display panel, and expose a pad layer, thereby to facilitate the subsequent electric performance test for the pad layer through a testing signal inputted thereto. For example, after the full-cutting step, merely the first laser (e.g., the carbon dioxide laser) may be activated, such that the first laser may generate the laser beam for the pad open cutting operation with the movement of the work table.

Further, after the entire glass substrate has been cut into the plurality of OLED display panels, the galvanometer scanner of the laser processing device is configured to control an incident angle of the laser beam to the surface of the to-be-processed workpiece, so as to perform a chamfer cutting operation on each OLED display panel, thereby to facilitate the installation of the OLED display panel onto a display device. To be specific, for example, the display panel acquired after the full-cutting step and the pad open cutting step may be adsorbed by an unload picker table and moved upward, a dummy strip of the flexible substrate acquired after the cutting may be removed by a removal unit, and then the remaining portion of the display panel may be transferred to a buffer table. Next, the display panel on the buffer table may be moved by the load picker onto a turning table (the display panel may be vacuum-adsorbed onto the turning table in such a manner that an edge of the pad region extends beyond the turning table). Next, the turning table may rotate to a pad peeling position, a support bar may move upward to be in flush with the turning table, and a peeling pin may peel the upper protection layer off from the pad region, starting from an edge of the pad region. The peeled upper protection layer may be moved by a clamping device into a collection box. Then, the support bar may move downward, the turning table may rotate again to a chamfer cutting portion, and the transmission path of the laser beam may be deflected by the galvanometer scanner so as to subject two corners of the pad region to the chamfer cutting operation. And then, the entire cutting process will be ended, and the resultant display panel may be moved by a picker to a tray for the subsequent process.

During the full-cutting operation and the chamfer cutting operation, it is necessary to fully cut the OLED display panel through the laser processing device, i.e., the OLED display panel may be cut into at least two portions. Hence, as shown in FIG. 8, the focal length may be adjusted in real time by each of the first focusing member 21 and the second focusing member 22, so as to perform the cutting operation at different depths. For example, the first laser beam 65 may be adjusted by the first focusing member 21 so as to be focused on the upper protection layer 61 of the OLED display panel, and the second laser beam 66 may be adjusted by the second focusing member 22 so as to be focused on the body layer 62 of the OLED display panel. In addition, the work table may be moved, so as to cut different portions of the OLED display panel. In FIG. 8, a hatched portion represents a region where the first laser beam 65 overlaps the second laser 66.

Through the adjustment of the focal length by the dynamic focusing lens in real time, it is able to perform the cutting operation at different depths. For example, when the upper protection layer is to be cut, in a full-cutting mode, a cutting depth for the carbon dioxide laser is more than 150 μm, and in a pad open cutting operation, a cutting depth for the carbon dioxide laser is about 130 μm.

According to the laser processing device in the embodiments of the present disclosure, it is able to, through a single process, cut the OELD display panel through the first laser beam and the second laser beam outputted coaxially, thereby to simplify the cutting operation of the OLED display panel and improve the cutting efficiency. In addition, centers of the two laser beams coincide with each other all the time, and due to an accumulative effect of the energy of the two coaxial laser beams along the cutting path, it is able to improve the energy utilization, reduce the laser energy, reduce the occurrence of smoke, dust and particles during the cutting process, and reduce the thermally-affected area, thereby to improve the cutting quality for the OLED display panel.

In addition, during the manufacture of the OLED display panel, a pad layer of the OLED display panel may be subjected to the cutting process through the laser processing device, so as to remove the upper protection layer of the OLED display panel, expose the pad layer, and facilitate the subsequent electric performance test on the pad layer through the testing signal inputted thereto, thereby to determine the unqualified OLED display panel. In this case, the focal length of the focusing member may be adjusted, so as to enable the laser beam generated by the laser processing device to be focused to the upper protection layer via the focusing member. When the focusing position of the laser beam is adjusted by the galvanometer scanner, the focal length may be adjusted through the dynamic focusing lens, so as to ensure the same cutting depth at different positions. Through the above procedures, it is able to cut the pad layer of the OLED display panel, thereby to facilitate the subsequent electric performance test on the pad layer.

It should be appreciated that, the to-be-processed workpiece may also be a display panel of another type, e.g., a liquid crystal display panel, or a plasma display pane, or another workpiece such as a metal workpiece, which will not be particularly defined herein.

Figure 7:
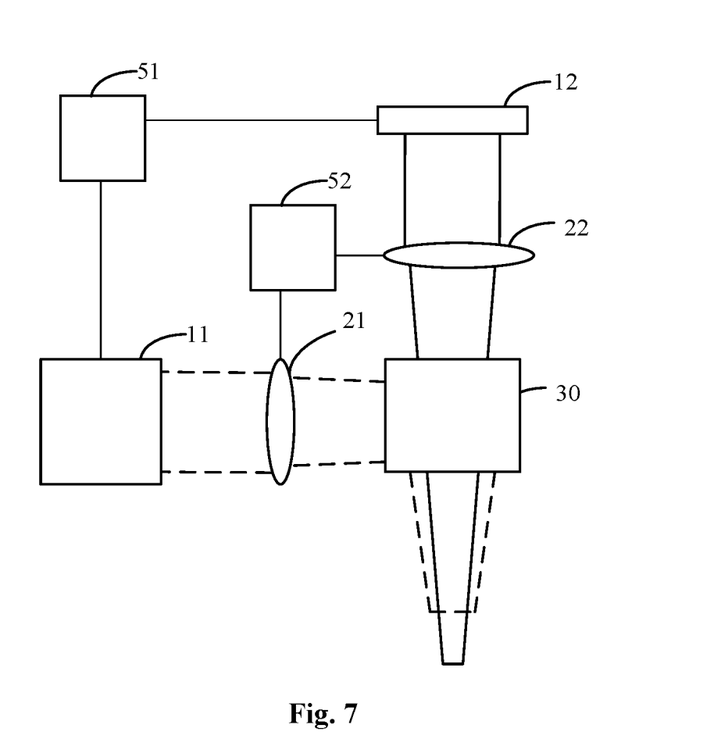
FIG. 7 is a schematic view showing a laser processing device according to yet another one embodiment of the present disclosure.

As shown in FIG. 7, the laser processing device may further include a first controller 51 and/or a second controller 52.

The first controller 51 may be connected to the at least two lasers 11, 12, and configured to control an operating state of each of the at least two lasers 11, 12 in accordance with a current operating mode. When the to-be-processed workpiece is being cut through the laser processing device, the laser processing device may be in, but not limited to, the full-cutting mode, the chamfer cutting mode and the pad open cutting mode, which will be described hereinafter.

In the full-cutting mode and the chamfer cutting mode, the laser processing device may control the at least two lasers each in an operating state. The beam combination member may coaxially output the laser beams generated by the at least two lasers and received by the focusing members to the to-be-processed workpiece, and the laser beams generated by different lasers may be focused to different positions of the to-be-processed workpiece through the focusing members. In this way, it is able to cut the OLED display panel through one process, and it is able to cut the to-be-processed workpiece into different components, thereby to simplify the cutting process of the OLED display panel and improve the cutting efficiency. In addition, the centers of the two laser beams coincide with each other all the time, and due to the accumulative effect of the energy of the two coaxial laser beams along the cutting path, it is able to improve the energy utilization, reduce the laser energy, reduce the occurrence of smoke, dust and particles during the cutting process, and reduce the thermally-affected area, thereby to improve the cutting quality for the OLED display panel.

In the pad open cutting mode, when the to-be-processed workpiece is the OLED display panel, it is merely necessary for the laser processing device to cut the upper protection layer of the OLED display panel, so as to expose the pad layer, thereby to facilitate the subsequent electric performance test on the pad layer through the testing signal inputted thereto. Hence, in this mode, it is merely necessary for the first controller 51 to control the laser for generating the laser beam to be focused to the upper protection layer of the OLED display panel to be in the operating state, with the other lasers being in an off state.

In particular, in the pad open cutting mode, the first laser 11 is the carbon dioxide laser, and the laser beam generated by the first laser 11 is adjusted by the first focusing member 21 so as to be focused to the upper protection layer of the OLED display panel. The second laser 12 is the femtosecond laser, and the laser beam generated by the second laser 12 is adjusted by the second focusing member 22 so as to be focused to the lower protection layer of the OLED display panel. At this time, the first controller 51 may control the first laser 11 to be in the operating state, and control the second laser 12 to be in the off state. Alternatively, the first controller 51 may control the first laser 11 to be in the off state, and control the second laser 12 to be in the operating state, and the focal length of the second focusing member 22 corresponding to the second laser 12 may be adjusted so as to focus the second laser beam transmitted through the second focusing member 22 to the upper protection layer of the OLED display panel; for example, when the focusing position of the laser beam generated by the second laser 12 focuses on the lower protection layer of the OLED display panel, the focusing position of the laser beam generated by the second laser 12 may be adjusted to be focused on the upper protection layer of the OLED display panel.

As mentioned above, the laser processing device may operate in various modes such as the full-cutting mode, the chamfer cutting mode and the pad open cutting mode, so it is able to enlarge an application range of the laser processing device.

In some embodiments of the present disclosure, as shown in FIG. 7, the laser processing device may further includes a second controller 52 that may be connected to the first focusing member 21 and the second focusing member 22, and configured to control the focusing members 21, 22 in accordance with the target focusing position, thereby to control the focusing position of the laser beam. To be specific, the second controller 52 may adjust the focal length and/or position of each of the focusing members 21, 22 in accordance with the cutting depth for the to-be-processed workpiece, so as to accurately focus the laser beam adjusted by the focusing members 21, 22 to a portion of the to-be-processed workpiece at the desired cutting depth, thereby to improve the flexibility of the cutting depth as well as the cutting quality.

In summary, as compared with the related art where the at least two laser beams are applied to the to-be-processed workpiece successively, in the embodiments of the present disclosure, the at least two laser beams are coaxially outputted by the laser processing device, so it is able to control the offset amount of each laser beam and prevent each laser beam from being offset greatly, thereby to improve the cutting quality for the to-be-processed workpiece and improve the yield. In addition, through the accumulation of the energy of the at least two laser beams outputted coaxially, it is able to increase the cutting depth through one laser cutting process, thereby to simplify the cutting operation and improve the cutting efficiency. Moreover, the at least two lasers for generating respectively the laser beams are arranged separately, and each laser corresponds to one focusing member for adjusting the focusing position of the laser beam generated by the laser, so it is able to enlarge the application range of each laser and adjust the focusing position of the laser beam generated by the laser beam flexibly.

Figure 6:
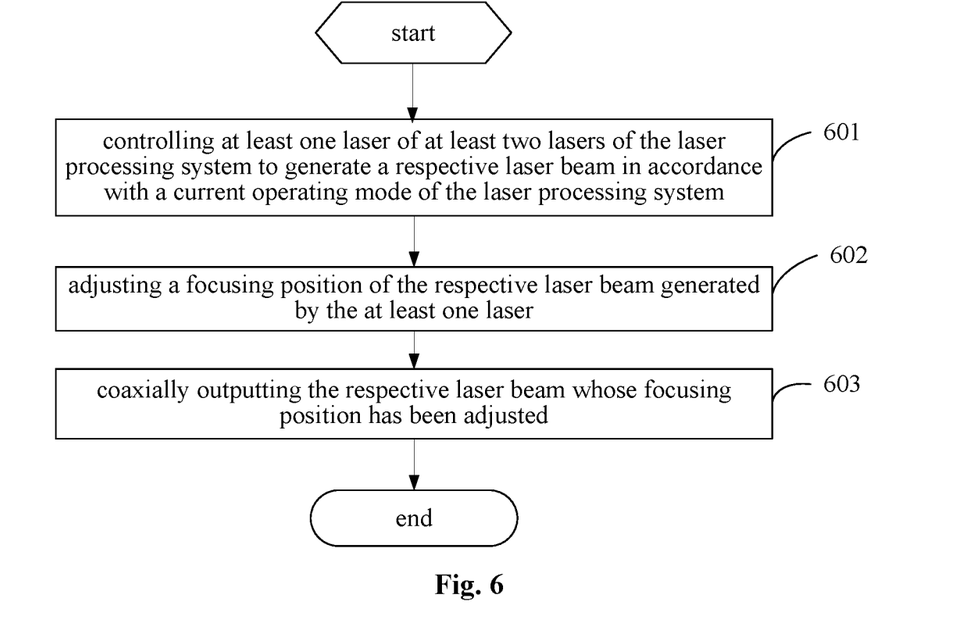
FIG. 6 is a flow chart of a method for manufacturing a display product according to one embodiment of the present disclosure.

The present disclosure further provides in some embodiments a method for manufacturing a display product through the above-mentioned laser processing device. As shown in FIG. 6, the method includes: Step 601: controlling at least one laser of at least two lasers of the laser processing device to generate a respective laser beam in accordance with a current operating mode of the laser processing device; Step 602 of adjusting a focusing position of the respective laser beam generated by the at least one laser; and Step 603 of coaxially outputting the respective laser beam whose focusing position has been adjusted.

In the embodiments of the present disclosure, with respect to different operating modes of the laser processing device, the operating states of the at least two lasers may be configured in advance for each operating mode. Hence, after the determination of the current operating mode of the laser processing device, the laser processing device may control the operating states of the at least two lasers in accordance with a predetermined configuration, so as to enable at least one laser of the at least two lasers to generate the laser beam. The following description will be given when the laser processing device includes a first laser and a second laser.

To be specific, when the laser processing device is in the full-cutting mode and the chamfer cutting mode, it may control each of the first laser and the second laser to be in the operating state, so as generate the laser beams respectively. When the laser processing device is in the pad open cutting mode, it may control one of the first laser and the second laser to be in the operating state and control the other one of the first laser and the second laser to be in the off state, so as to generate one light beam.

After the laser processing device has controlled the at least one laser of the at least two lasers to generate the laser beam in accordance with the current operating mode, the focusing position of the laser beam generated by the at least one laser may be adjusted, and the laser beam generated by the at least one laser whose focusing position has been adjusted may be outputted coaxially. The adjustment of the focusing positions of the laser beams and the coaxial output of the laser beams may refer to those mentioned hereinabove, and thus will not be particularly defined herein.

Through the above, the laser processing device may adjust the operating state of each laser and the focusing position of each laser beam in accordance with the current operating mode, so as to enlarge the application range of the laser processing device.

When the at least two lasers of the laser processing device generate the laser beams respectively and the laser beams are outputted coaxially to the to-be-processed workpiece, as compared with the related art where the at least two laser beams are applied to the to-be-processed workpiece successively, it is able to control the offset amount of the cutting line of each of the at least two laser beams and prevent the cutting line of each laser beam from being offset greatly, thereby to improve the cutting quality for the to-be-processed workpiece and improve the yield. In addition, through the accumulation of the energy of the at least two laser beams outputted coaxially, it is able to increase the cutting depth through one cutting process, thereby to simplify the cutting operation and improve the cutting efficiency. Moreover, the at least two lasers for generating the laser beams are arranged separately, and each laser corresponds to one focusing member for adjusting the focusing position of the laser beam generated by the laser, so it is able to enlarge the application range of each laser and adjust the focusing position of the laser beam generated by the laser beam flexibly.

Further, the controlling the at least one laser of the at least two lasers of the laser processing device to generate the laser beam in accordance with the current operating mode of the laser processing device may include, when the current operating mode of the laser processing device is the full-cutting or chamfering operating mode, controlling the at least two lasers of the laser processing device to generate the laser beams respectively.

For example, the first laser beam may be generated by the first laser, the second laser beam may be generated by the second laser, and the to-be-processed workpiece may be an OLED display panel including an upper protection layer, a body layer and a lower protection layer. At this time, after the first laser and the second laser have been controlled to be in the operating state and generate the first laser beam and the second laser beam respectively, the laser processing device may further adjust the focusing positions of the first laser beam and the second laser beam in such a manner as to focus the first laser beam to the upper protection layer and focus the second laser beam to the body layer. In this regard, when the first laser beams and the second laser beam are controlled by the laser processing device to be coaxially outputted to the OLED display panel, it is able to cut the upper protection layer through the first laser beam, and cut the body layer and the lower protection layer through the second laser beam, thereby to cut the OLED panel as a whole.

Further, in the above-mentioned operating modes, the controlling the at least two lasers of the laser processing device to generate the laser beams respectively may include controlling at least one carbon dioxide laser and at least one femtosecond laser of the laser processing device to generate the laser beams respectively.

When the laser processing device includes merely the first laser and the second laser, the first laser may be the carbon dioxide laser, and the second laser may be the femtosecond laser. In addition, the focusing position of the first laser beam generated by the carbon dioxide laser may be adjusted so as to be focused to the upper protection layer of the OLED display panel, and the focusing position of the second laser beam generated by the femtosecond laser may be adjusted so as to be focused to the body layer of the OLED display panel.

In this regard, at the beginning of the cutting operation, due to a large amount heat generated by the carbon dioxide laser, it is able to cut the to-be-processed workpiece to a certain depth quickly. Due to a small focal length, it is impossible for the laser beam generated by the carbon dioxide laser to cut a portion of the to-be-processed workpiece at a larger depth. The laser beam generated by the femtosecond laser has a larger focal length, so it is able to cut a portion of the to-be-processed workpiece at a larger depth. At this time, through the femtosecond laser, the laser beam having a larger focal length may be provided, so as to perform the cutting operation at a larger depth. Through the combination of such two types of lasers, it is able to improve the cutting efficiency while ensuring the cutting precision.

It should be appreciated that, such terms as "comprising" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the element defined by such sentence as "including one . . . ", it is not excluded that the procedure, method, article or device including the element may also include other identical elements.

Through the above-mentioned description, it may be apparent for a person skilled in the art that the methods in the embodiments of the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include multiple instructions so as to enable a terminal device (such as mobile phone, computer, server, air conditioner or network device) to execute the methods in the embodiments of the present disclosure.

The above embodiments of the present disclosure have been described in association with the drawings, but the present disclosure is not limited thereto. The above embodiments are for illustrative purposes only. Under the teaching of the present disclosure, a person skilled in the art may make further modifications without departing from the scope of claims and the principle of the present disclosure, and these modifications shall also fall within the scope of the present disclosure.

What is claimed is:

1. A method for manufacturing a display product through a laser processing device, comprising:
controlling at least one laser of at least two lasers of the laser processing device to generate a respective laser beam in accordance with a current operating mode of the laser processing device, wherein the current operating mode of the laser processing device comprises a full-cutting mode, a chamfer cutting mode, or a pad open cutting mode;
adjusting a focusing position of the respective laser beam generated by the at least one laser; and
outputting the respective laser beam whose focusing position has been adjusted, wherein when multiple laser beams are present, the multiple laser beams are outputted coaxially;
the display product is an organic light-emitting diode (OLED) display panel comprising an upper protection layer, a body layer and a lower protection layer,
wherein the controlling the at least one laser of the at least two lasers of the laser processing device to generate the respective laser beam in accordance with the current operating mode of the laser processing device comprises:
when the current operating mode of the laser processing device is the pad open cutting mode, controlling one of the at least two lasers of the laser processing device to generate the laser beam, and controlling remaining one or more lasers of the at least two lasers of the laser processing device to be in an off state,
wherein the controlling one of the at least two lasers of the laser processing device to generate the laser beam, and controlling remaining one or more lasers of the at least two lasers of the laser processing device to be in the off state comprises:
controlling at least one femtosecond laser of the laser processing device to generate the laser beam, and at least one carbon dioxide laser of the laser processing device to be in the off state;
adjusting the focusing position of the respective laser beam generated by the at least one laser comprises:
when the focusing position of the respective laser beam generated by the at least one femtosecond laser focuses on the lower protection layer of the OLED display panel, adjusting the focusing position of the respective laser beam generated by the at least one femtosecond laser to be focused on the upper protection layer of the OLED display panel.

2. The method according to claim 1, wherein the controlling the at least one laser of the at least two lasers of the laser processing device to generate the respective laser beam in accordance with the current operating mode of the laser processing device comprises: when the current operating mode of the laser processing device is the full-cutting mode or the chamfer cutting mode, controlling the at least two lasers of the laser processing device to generate the respective laser beams,
wherein the controlling the at least two lasers of the laser processing device to generate the respective laser beams comprises:
controlling at least one carbon dioxide laser and at least one femtosecond laser of the laser processing device to generate the respective laser beams;
adjusting the focusing position of the respective laser beam generated by the at least one laser comprises:
adjusting the focusing position of the respective laser beam generated by the at least one carbon dioxide laser to be focused on the upper protection layer of the OLED display panel, and adjusting the focusing position of the respective laser beam generated by the at least one femtosecond laser to be focused on the body layer of the OLED display panel.

3. The method according to claim 2, wherein in the pad open cutting mode, the substrate is cut into a plurality of substrate units, and a pad open cutting operation is performed on each of the substrate units through the laser beam.

4. The method according to claim 3, wherein the pad open cutting operation is performed on each of the substrate units, and then a chamfer cutting operation is performed on the substrate unit through the laser beams, and when the current operating mode of the laser processing device is the chamfer cutting mode, subsequent to controlling the at least two lasers of the laser processing device to generate the respective laser beams, the method further comprises:
controlling an incident angle of each of the laser beams relative to a surface of each of the substrate units through a galvanometer scanner, to perform the chamfer cutting operation on the substrate unit.

5. The method according to claim 1, wherein in the full-cutting mode, a substrate is cut into a plurality of substrate units through the laser beam, and before the current operating mode of the laser processing device becomes the full-cutting mode, the method further comprises:
positioning the substrate on a work table, to enable a cutting region of the substrate to be located above a groove in the work table, and subject the substrate to vacuum adsorption.

6. A laser processing device, comprising:
at least two lasers, wherein each of the at least two lasers is configured to generate a respective laser beam;
a plurality of focusing members, wherein the focusing members are arranged corresponding to the at least two lasers respectively, and configured to adjust focusing positions of at least two laser beams generated by the at least two lasers;
a beam combination member configured to receive the at least two laser beams whose focusing positions have been adjusted, and coaxially output the at least two laser beams; and
a galvanometer scanner configured to receive the at least two laser beams outputted coaxially by the beam combination member, and coaxially output the at least two laser beams to a to-be-processed workpiece,
wherein the to-be-processed workpiece is an organic light-emitting diode (OLED) display panel comprising an upper protection layer, a body layer and a lower protection layer;
the at least two lasers comprise a carbon dioxide laser and a femtosecond laser, wherein when a current operating mode of the laser processing device is a pad open cutting mode, and the focusing position of the first laser beam generated by the femtosecond laser is focused on the lower protection layer of the OLED display panel, the first laser beam generated by the femtosecond laser is adjusted by one of the focusing members corresponding to the first laser to enable the focusing position of the first laser beam to be focused on the upper protection layer of the OLED display panel, and the carbon dioxide laser is configured to be in an off state.

7. The laser processing device according to claim 6, wherein each of the focusing members is a dynamic focusing lens having a variable focal length, or a focusing lens having a fixed focal length and located at a variable position relative to the beam combination member.

8. The laser processing device according to claim 7, wherein when the current operating mode of the laser processing device is the full-cutting mode or the chamfer cutting mode, the first laser beam is generated by the carbon dioxide laser and adjusted by one of the focusing members corresponding to the first laser to enable a focusing position of the first laser beam to be focused on the upper protection layer of the OLED display panel, and the second laser beam is generated by the femtosecond laser and adjusted by another one of the focusing members corresponding to the second laser to enable a focusing position of the second laser beam to be focused on the body layer of the OLED display panel.

9. The laser processing device according to claim 8, wherein when the current operating mode of the laser processing device is the full-cutting mode or the chamfer cutting mode, an optical axis of the first laser beam perpendicularly intersects an optical axis of the second laser beam at the beam combination member.

* * * * *